US012674816B2

(12) United States Patent
Jourdan et al.

(10) Patent No.: US 12,674,816 B2
(45) Date of Patent: Jul. 7, 2026

(54) TRANSDUCTION DETECTION DEVICE USING PIEZORESISTIVE ELEMENT AND A THERMAL DISSIPATOR ELEMENT

(71) Applicant: COMMISSARIAT A L'ENERGIE ATOMIQUE ET AUX ENERGIES ALTERNATIVES, Paris (FR)

(72) Inventors: Guillaume Jourdan, Grenoble (FR); Philippe Robert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 321 days.

(21) Appl. No.: 18/261,028

(22) PCT Filed: Jan. 11, 2022

(86) PCT No.: PCT/EP2022/050393
§ 371 (c)(1),
(2) Date: Jul. 11, 2023

(87) PCT Pub. No.: WO2022/152670
PCT Pub. Date: Jul. 21, 2022

(65) Prior Publication Data
US 2024/0061009 A1 Feb. 22, 2024

(30) Foreign Application Priority Data
Jan. 12, 2021 (FR) ..................................... 2100249

(51) Int. Cl.
*G01P 15/12* (2006.01)

(52) U.S. Cl.
CPC .................................. *G01P 15/123* (2013.01)

(58) Field of Classification Search
CPC ... B81B 3/0078; B81B 3/0086; B81B 3/0081; G01L 1/2281; G01P 1/006
See application file for complete search history.

(56) References Cited

U.S. PATENT DOCUMENTS

| | | | | |
|---|---|---|---|---|
| 4,750,363 A | * | 6/1988 | Norling ................... | G01P 1/006 73/497 |
| 5,101,669 A | * | 4/1992 | Holm-Kennedy .......................... | G01P 15/0802 361/278 |

(Continued)

FOREIGN PATENT DOCUMENTS

EP          3 339 242 A1      6/2018

OTHER PUBLICATIONS

International Search Report & Written Opinion Issued Apr. 7, 2022, in PCT/EP2022/050393, filed on Jan. 11, 2022, 10 pages.

*Primary Examiner* — Tran M. Tran
(74) *Attorney, Agent, or Firm* — Oblon, McClelland, Maier & Neustadt, L.L.P.

(57) ABSTRACT
A transduction detection device includes a substrate, at least one movable ground relative to the substrate and a suspended stress gauge provided with a piezoresistive element which includes a first anchoring and a second anchoring, different from the first anchoring, relative to the movable ground, wherein it includes at least one thermal dissipator element thermally conductively connected: to a connection portion of the piezoresistive element located outside of the anchorings, and to a thermal discharge part.

21 Claims, 6 Drawing Sheets

(56) References Cited

U.S. PATENT DOCUMENTS

| | | | | |
|---|---|---|---|---|
| 5,186,053 | A * | 2/1993 | Egley | G01P 1/006 |
| | | | | 73/497 |
| 5,996,411 | A * | 12/1999 | Leonardson | G01P 15/0802 |
| | | | | 73/514.37 |
| 7,498,911 | B2 * | 3/2009 | Forehand | H01H 59/0009 |
| | | | | 335/78 |
| 8,616,059 | B2 * | 12/2013 | Walther | B81B 3/0051 |
| | | | | 73/514.29 |
| 8,760,233 | B2 * | 6/2014 | Steeneken | H03H 9/02259 |
| | | | | 331/116 R |
| 9,146,252 | B2 * | 9/2015 | Robert | G01P 15/0802 |
| 9,528,895 | B2 * | 12/2016 | Robert | G01L 9/006 |
| 9,702,893 | B2 * | 7/2017 | Robert | G01P 15/123 |
| 9,815,686 | B2 * | 11/2017 | Walter | G01Q 20/04 |
| 9,922,901 | B2 * | 3/2018 | Aramaki | H01L 23/433 |
| 10,734,305 | B2 * | 8/2020 | Kanaya | H01L 23/42 |
| 10,868,511 | B2 * | 12/2020 | Jourdan | H03H 9/02448 |
| 10,917,026 | B2 * | 2/2021 | Jourdan | H02N 10/00 |
| 11,085,945 | B2 * | 8/2021 | Joet | G01P 15/123 |
| 11,099,093 | B2 * | 8/2021 | Potasek | G01L 9/065 |
| 11,125,632 | B2 * | 9/2021 | Rey | G01C 19/5755 |
| 11,414,318 | B2 * | 8/2022 | Jourdan | G01P 1/003 |
| 11,852,649 | B2 * | 12/2023 | Konno | G01P 1/006 |
| 11,874,291 | B2 * | 1/2024 | Jemili | G01P 1/006 |
| 2012/0229226 | A1 * | 9/2012 | Oja | H03H 9/2436 |
| | | | | 331/158 |
| 2013/0091949 | A1 * | 4/2013 | Huang | G01P 15/123 |
| | | | | 73/514.34 |
| 2014/0076024 | A1 | 3/2014 | Duraffourg et al. | |
| 2014/0183669 | A1 * | 7/2014 | Xu | B81B 3/0021 |
| | | | | 438/52 |
| 2015/0204746 | A1 * | 7/2015 | Bemis | G01L 9/065 |
| | | | | 73/719 |
| 2017/0059420 | A1 * | 3/2017 | Rey | G01C 19/5607 |
| 2017/0113918 | A1 | 4/2017 | Walter et al. | |
| 2017/0117825 | A1 * | 4/2017 | Jourdan | B81B 3/0024 |
| 2017/0313436 | A1 * | 11/2017 | Lamberti | G01M 5/0083 |
| 2018/0327253 | A1 * | 11/2018 | Jourdan | G02B 6/3584 |

* cited by examiner

Detail A

A-A

D-D

E-E

TRANSDUCTION DETECTION DEVICE USING PIEZORESISTIVE ELEMENT AND A THERMAL DISSIPATOR ELEMENT

TECHNICAL FIELD OF THE INVENTION

The present invention relates to the field of piezoresistive detection devices.

Generally, this type of device calls upon the transduction capacity of piezoresistive materials. These can be inertial sensors of the accelerometer, gyroscope or gyrometer type, with one axis or multiple axes, or also pressure sensors, magnetometers or microphones. This relates to sensors in the form of microelectronic devices. By microelectronic device, this means any type of device made with microelectronic means. These devices include micromechanical or electromechanical devices (MEMS, NEMS, etc.).

STATE OF THE ART

Piezoresistive nanogauges are used in numerous MEMS sensors as transducers between a mechanical magnitude to be measured (pressure, acceleration, rotation, etc.) and an electric magnitude which can be used in electronics (voltage, current or resistance). This type of transduction uses the piezoresistivity of a gauge to convert a stress or a mechanical deformation in electrical resistance variation.

Document US 2017/113918 A1 discloses a differential-type transduction detection complex solution. Document EP 3 339 242 A1 itself discloses a tuneable bandwidth detection system.

FIG. 1 presents an example of a known detection device, in this case an accelerometer, wherein a ground 2 is movably mounted relative to a substrate 1, for example silicon-based. In the case in point, it is sought to measure a movement of the movable ground 2 in rotation in the plane of the substrate 1, i.e. a rotation about an axis in a direction perpendicular to this plane. In this example, the ground 2 is movable around this rotation direction, thanks to at least one hinge 4 which connects, with a free of rotation movement in the direction perpendicular to the plane, the ground 2 to an anchoring zone integrated in the substrate.

The rotation movement can be translated into an electrical value by way of a stress gauge 3 using the capacity of a piezoresistive material to convert a mechanical magnitude into an electrical magnitude, and, primarily, into electrical resistance variation. In the case represented, two gauges 3 work in opposition (when one is in traction, the other is in compression) and each have the form of a beam, a first end 31 of which is anchored on a mounting zone integrated with the substrate 1 and the other end 32 of which is anchored on the movable ground 2. The beam of the gauge 3 generally has a dimension in length directed along a detection direction.

It is understood that a movement of the ground 2 in a plane will produce a deformation of the gauges 3, in this case, mainly in traction/compression, which will induce an electrical resistance variation of the piezoresistive material of each gauge 3, electrical resistance variation which can be measured by a measuring circuit. The latter can, for example, detect a variation of the ratio between the voltage at the terminals of the gauge and the current which passes through it over time, so as to evaluate the resistance variation. A Wheatstone bridge can also be implemented to measure an imbalance proportional to the resistance variation.

The electronic measuring part typically comprises a polarisation current generator and a circuit for measuring voltage variations, which reveal electrical resistivity variations in the gauge, themselves according to the deformation of the gauge. Thus, a transduction of electrical signal mechanical deformations (or forces) is performed.

Generally, the measurement can be conveyed as follows in an equation linking the measuring voltage (V) and the polarisation current ($I_0$):

$$V = \Delta R I_0 = R I_0 \pi \varepsilon \text{ as } \frac{\Delta R}{R} = \pi \varepsilon$$

V=the measuring voltage
$\pi$=piezoresistivity coefficient
R=electrical resistance
$\varepsilon$=deformation which is proportional:
   to the movement of the movable part $$\varepsilon = \frac{x}{L}$$

where L is the length of the beam of the gauge;
to the force applied on the ends in the direction of the
   length $$\varepsilon = \frac{F}{SE}$$

where S is the cross-section of the gauge and E is the
   Young's modulus.

The signal/noise ratio (SNR) of the final sensor (outside of the noise in 1/f; for example, this situation is encountered if the SNR in the proximity of an operating frequency different from 0 is concerned, in a zone or the noise in 1/f is insignificant with respect to the other noises (Johnson noise, electronic circuit noise, etc.) partially depends on the polarisation current, as the following equation illustrates:

$$SNR = \frac{R I_0 \pi \varepsilon}{\sqrt{4 k_B T R B + S_{elec}}} \alpha I_0$$

With B: the measuring bandwidth, T the temperature, $k_B$
   the Boltzmann constant, $S_{elec}$ the electronics noise; the
   sign a means, in this case, a proportional relationship to
   $I_0$.

It is therefore natural to seek to increase the polarisation current, with the aim of improving the detection device.

Nevertheless, the increase of the polarisation current is limited due to the heating that induces this current inside the gauge. In particular, the self-heating of the gauge obeys the following equation:

$$\Delta T_{max} = \frac{R_{th}}{8} P \alpha I_0^2 \text{ With } R_{th} = \frac{L}{kS}$$

the thermal resistance, K the thermal conductivity of the material which composes the gauge; the sign a means, in this case, a proportionality relationship to $I_0^2$.

It results from this that the heating of the gauge is a quadratic function of the polarisation current. In practice, for a doped silicon gauge, the heating can be as follows:

$\kappa \approx 50$ S.I $R_{th} = 1.5$ K·μW$^{-1}$ $R \approx 2000 \Omega$

This products a self-heating as follows, according to the current circulating in the gauge:

P=20 μW (I=100 μA): around 4 K,

P=320 μW (I=400 μA): around 64 K,

P=1280 μW (I=800 μA): around 256 K.

If it is assumed that the electrical parameters and thermal conductivity remain constant. In practice, the heating can be transported (FIG. 3) due to a drop in thermal conductivity with the temperature (FIG. 4).

FIG. 2 schematically conveys the damaging repercussions of a temperature which is too high inside the gauge. Indeed, a thermal excess is schematised there, observed particularly at the middle of the length of the gauge (referenced L in the formulas), in this case in the form of a beam made of a silicon nanowire. The three examples of thermal power provided above moreover reflect the quadratic character of the increase in temperature with the polarisation current.

The heating can prove to be such as it degrades, possibly irreversibly, the operation of the gauge. FIG. 3 shows, at two different ambient temperature levels (respectively 20° C., and 140° C. in a brighter line) for operating the gauge, the development of the measuring voltage (in volts) relative to the current (in μA). These two curves provide the same information. When the absolute value of the current does not exceed a first threshold of around 400 μA, the obtained function is substantially linear. In this context, the operation of the gauge can be considered as reliable. Beyond this threshold, the curve is not linear and conveys a drop in electrical conductivity. After a second threshold (in this case, around 750/800 μA), the voltage plateaus, which conveys a high degradation of the operation of the gauge, that can be associated with the passage of a behaviour extrinsic to an intrinsic behaviour of the semiconductor. At such current levels, the effects of the temperature can destroy the gauge or, at the very least, affect its qualities irreversibly.

FIG. 4 is a representation of the development of the thermal conductivity (in W·cm$^{-1}$·K$^{-1}$) according to the temperature in degrees Kelvin. The decrease of the thermal conductivity with the temperature tends to amplify the self-heating, as the dissipated power is, more and more contained in the nanowire.

Finally, it emerges from FIG. 5, which is purely schematic, that a potential solution consisting of increasing the length of the gauge is actually not effective if the signal/noise ratio for the movement signal x of the ground 2 is concerned. The resistance R mentioned in the first formula above increases linearly with the piezoresistive beam length, but the increase of the length has a negative impact, conversely proportional, on the deformation:

$$\varepsilon = \frac{x}{L}.$$

This compensation is revealed by the horizontal part of the logarithmic function of FIG. 5. In addition, when the length increases too much (in this case, beyond the threshold $L_c$), this function is degraded even due to the predominance of the thermal noise of the resistance.

Therefore, a temperature range, and consequently a polarisation current range which is acceptable for a reliable operation of the piezoresistive element of the gauge should be remained in.

There is therefore a need to propose detection devices which optimise the operation of the piezoresistive element, and, in particular, which optimises the polarisation current.

Other aims, features and advantages of the present invention will appear upon examining the description below and the accompanying drawings. It is understood that other advantages can be incorporated.

SUMMARY OF THE INVENTION

To achieve this aim, according to an embodiment, a transduction detection device is provided, comprising a substrate, at least one ground which is movable relative to the substrate and a suspended stress gauge provided with a piezoresistive element which comprises a first anchoring relative to an anchoring portion and a second anchoring, different from the first anchoring relative to the movable ground.

Advantageously, the device comprises at least one thermal dissipator element thermally conductively connected, on the one hand, to a connection portion of the piezoresistive element located outside of the anchorings, and on the other hand, to a part of the device, called thermal discharge part, other than the piezoresistive element.

According to an aspect, the part of the device other than the piezoresistive element is the substrate. Alternatively, this can be the movable ground. This can also be the anchoring portion.

Thus, a device is formed, which can, upon equivalent thermal heating of the piezoresistive element, support greater polarisation currents, being reminded that the increase of the polarisation current is favourable to the increase of the signal/noise ratio.

While the piezoresistive element is usually considered as an individualised mechanical member which implies it is to be dealt with individually from the rest of the detection device, the present invention associates it with at least one thermal energy dissipation element.

Advantageously, the thermal energy dissipation element is configured to not disrupt, or in a highly limited manner and at the very least prohibitively, the mechanical and/or electrical behaviour of the piezoresistive element. Thus, the dissipator element(s) can be designed so as to minimise their rigidity in the detection direction, which can, typically, be the longitudinal direction of a beam made of a piezoresistive material. Moreover, the additional electrical resistance caused by the thermal energy dissipation element can be reduced as much as possible.

The gauge or piezoresistive element can, for example, be suspended above a face of the substrate. Optionally, at least one thermal dissipator element is made of a material different from that of the piezoresistive element. The thermal dissipator element can be located above the piezoresistive element.

This thermal dissipator can itself be connected to the substrate. This connection ensures, at the very least, a thermal conduction so as to discharge heat towards the substrate. This can serve to mechanically maintain its structure.

The notion of thermal resistance of the dissipative element serves to form a thermal connection between gauge and substrate by this connection; this thermal resistance is preferably less than that of the gauge, advantageously at least five times less.

The device can be integrated in an apparatus comprising a function utilising a detection of movement values (kinematically, kinetically or dynamically); these can also be pressure sensors, magnetometers or microphones.

BRIEF DESCRIPTION OF THE FIGURES

The aims, objectives, as well as the features and advantages of the invention will best emerge from the detailed description of an embodiment of the latter which is illustrated by the following accompanying drawings, wherein.

Figure 1:
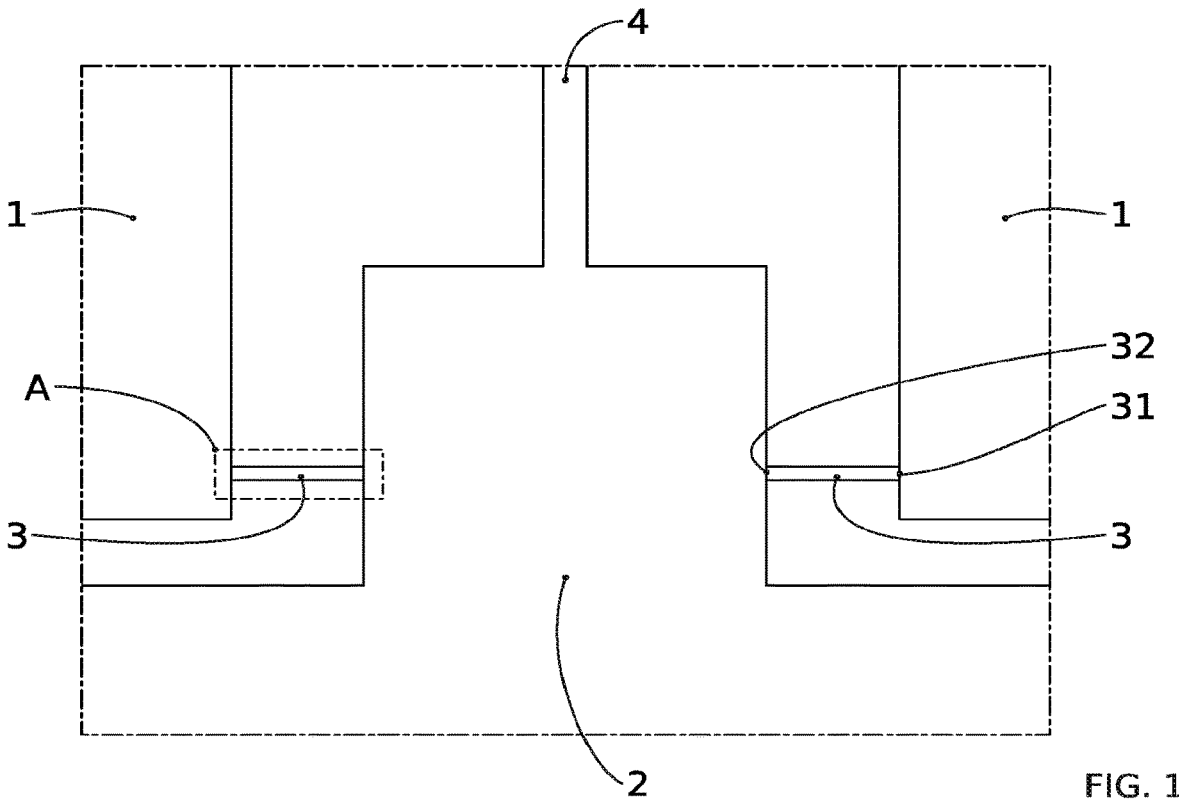
FIG. 1 represents an example of a known structure of a detection system in the form of an accelerometer.

The drawings are given as examples, and are not limiting of the invention. They constitute principle schematic representations intended to facilitate the understanding of the invention and are not necessarily to the scale of practical applications.

DETAILED DESCRIPTION OF THE INVENTION

Before starting a detailed review of embodiments of the invention, optional features are stated below, which can optionally be used in association or alternatively:

According to an option, the thermal discharge part is the substrate, or the movable ground or the anchoring portion of the first anchoring.

In a case, the anchoring portion is a portion of the substrate 1; thus, the part 31 is connected, preferably fixedly in this case, relative to the substrate 1.

According to an example, the piezoresistive element 3 comprises a first rigidity, in a detection direction (Y) in which the piezoresistive element 3 is urged in traction or in compression, and according to which, the thermal dissipator element 5 has, in the detection direction, a second rigidity which is strictly less than the first rigidity.

According to an option, the second rigidity is at least five times lower than the first rigidity.

According to another option, the thermal dissipator element (5) has, at the connection portion, an oblique main direction relative to a long dimension of the piezoresistive element (3). The thermal dissipator element 5 thus forms, at the connection portion, a change of direction relative to a long dimension of the piezoresistive element 3.

According to an example, the thermal dissipator element 5 comprises a suspended part extending from the connection portion.

Optionally, the thermal dissipator element 5 comprises an arm 51.

According to an option, the arm 51 has a longitudinal dimension directed obliquely in the detection direction.

According to an option, the longitudinal dimension is perpendicular to the detection direction.

In an embodiment, the arm 51 has a shape ratio of the longitudinal dimension and its dimension in the detection direction of at least 5.

In an embodiment, the arm 51 has, in a direction perpendicular to its longitudinal dimension and the detection direction, a dimension by height greater than a dimension by height of the piezoresistive element 3.

According to an example, the connection portion is located in the middle of a long dimension of the piezoresistive element 3.

According to an example, the thermal dissipator element 5 has a thermal conductance greater than or equal to that of the piezoresistive element 3, and preferably at least five times, even ten times greater.

According to an example, the thermal dissipator element 5 has at least one degree of freedom of movement relative to the thermal discharge part, preferably in the deformation direction of the gauge.

Optionally, the thermal dissipator element 5 comprises a spring member 54.

According to an option, in particular outside of low frequencies, for example, for a gyrometer, the thermal dissipator element 5 comprises a resonance frequency strictly greater than that of an assembly formed by the gauge and the movable ground 2, and preferably at least five, even ten times greater. This resonance frequency can be obtained on the structure without the dissipator element, with the two gauge portions which only form one of them.

According to an example, the piezoresistive element 3 is a beam.

In an embodiment, the device comprises several thermal dissipator elements 5.

According to an aspect, the thermal dissipator elements 5 are each connected to a connection portion of the piezoresistive element 3, the connection portions cutting the piezoresistive element 3 into sections of identical length along the long dimension of the piezoresistive element.

According to an option, the thermal dissipator elements 5 are each connected to a connection portion of the piezoresistive element 3, the connection portions being located symmetrically around the middle of the long dimension of the piezoresistive element 3. They can also be located on either side of the piezoresistive element, alternately.

Preferably, each dissipator 5 is conductively thermally connected to the substrate 1.

The thermal dissipator can be made of an electrically insulating or slightly conductive material (non-doped silicon contrary to the gauge): in the present invention, it is not intended to drive an electrical current, even if this is not prohibited for other reasons, but mainly to drive the thermal energy.

If the material is conductive, a measurement of the voltage at the connection point can advantageously be taken to control the deformation state of the gauge.

It is specified that, in the scope of the present invention, the term "on" or "above" does not compulsorily mean "in contact with". Thus, for example, the deposition of a layer on another layer, does not compulsorily mean that the two layers are directly in contact with one another, but this means that one of the layers covers the other at least partially by being, either directly in contact with it, or by being separated from it by a film, or also another layer or another element. In particular, the stress gauge is generally suspended above a face of the substrate, which implies an intermediate space, generally filled with air, between said gauge and this face of the substrate. A layer can moreover be composed of several sublayers made of one same material or of different materials.

It is specified that, in the scope of the present invention, the thickness of a layer or of the substrate is measured in a direction perpendicular to the surface according to which this layer or this substrate has its maximum extension. If a layer is not totally flat, in particular because it has defects which can be raised on the exposed face of said layer, the thickness extends from the dimension of this layer outside of its defects.

Certain parts of the device of the invention can have an electrical function. Some are used for electrical conduction properties and elements formed of at least one material having a sufficient electrical conductivity are understood as having an electrically conductive nature, in the application, to achieve the desired function.

Certain parts of the device of the invention can have a thermal function. Some are used for thermal conduction properties and elements formed of at least one material having a sufficient thermal conductivity are understood as having a thermally conductive nature, in the application, to achieve the desired function; in particular, to limit the temperature of another element by dissipating the thermal energy of this element.

A substrate, an element, a layer or other "with the basis" of a material M, this means a substrate, an element, a layer comprising this material M only, or this material M and optionally other materials, for example alloy elements, impurities or doping elements. If necessary, the material M can have different stoichiometries.

Apart from for the presence of at least one thermal dissipator element detailed below, the given description of FIG. 1 is applicable to the embodiment of the invention. In particular, the movable ground 2 is subsequently presented schematically, being understood that it itself typically has a mechanical connection other than the piezoresistive element 3, for example in the form of an articulation suspending it above the substrate, as was the case of part 4, referenced in FIG. 1.

The gauge has, or consists of, a piezoresistive element 3. The latter can, in particular, be made from silicon, preferably doped in order to decrease its resistivity. Other semiconductive materials, and in particular, germanium, preferably also doped, are possible. These can also be metals like nickel or platinum; or also a metal/silicon alloy, such as aluminium silicide.

In practice, below, examples of typical dimensions of nanogauges implemented to produce sensors are given:
  length L of a few micrometres to several tens of micrometres, and for example, between 5 μm and 100 μm;
  cross-section S, for example square, of a few tens of nanometres to several micrometres, and for example, between 5 nm and 20 μm;
  for silicon, variable boron (p), phosphorus (n) doping of $10^{16}$ to $8 \cdot 10^{19}$ cm$^{-3}$.

Figure 3:
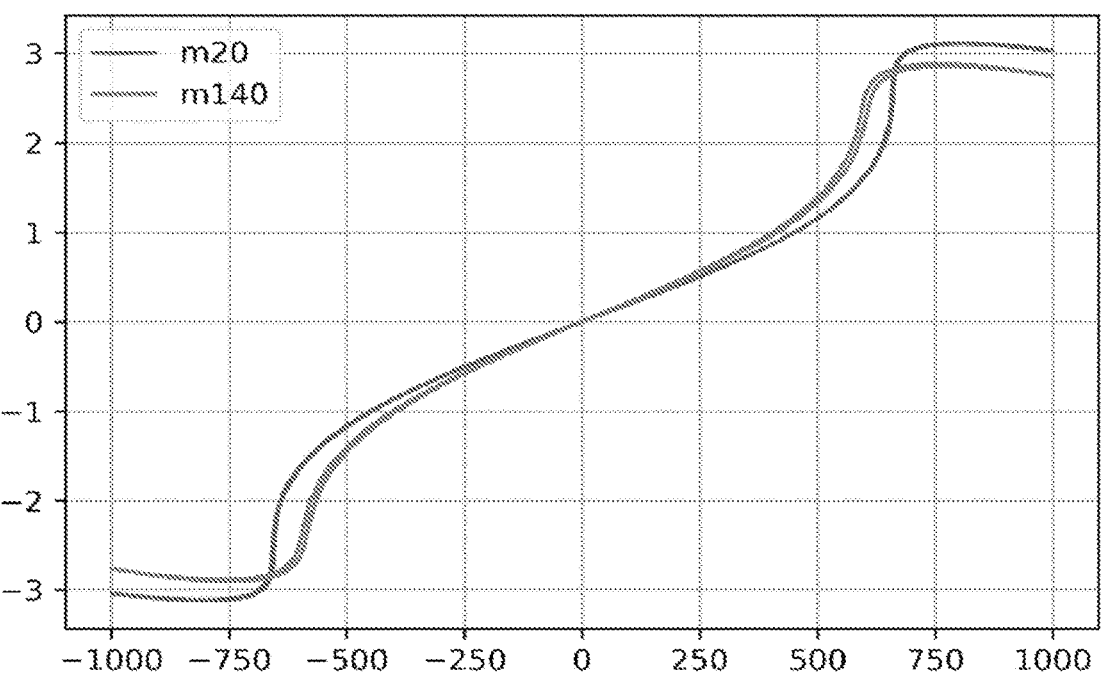
FIG. 3 represents a development curve of the measuring voltage relative to the polarisation current, at two operating ambient temperature levels of the gauge, namely 20° C. and 140° C.
Figure 4:
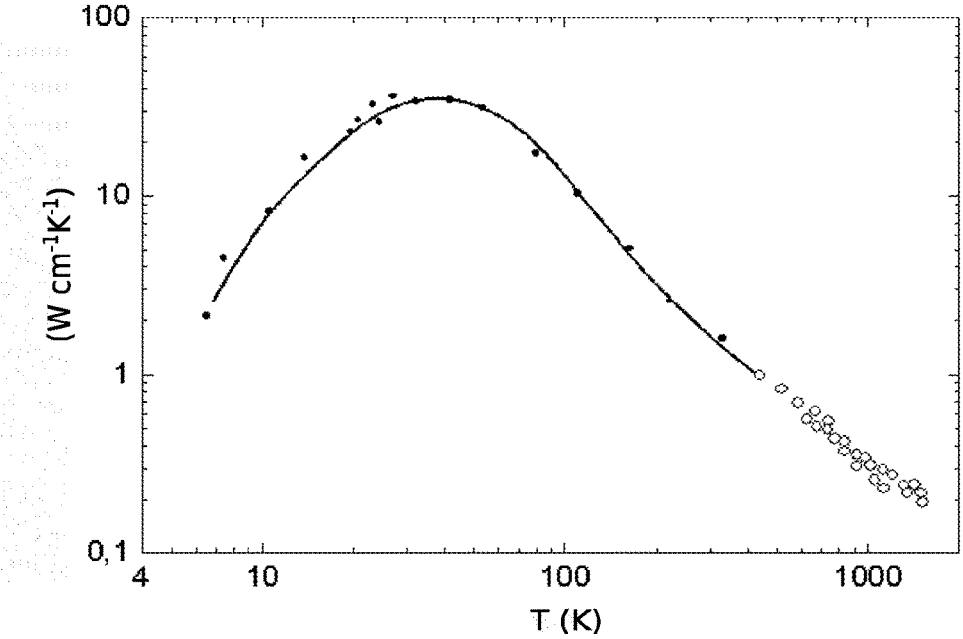
FIG. 4 illustrates the development of the thermal conductivity of a silicon-based piezoresistive element according to its temperature.
Figure 5:
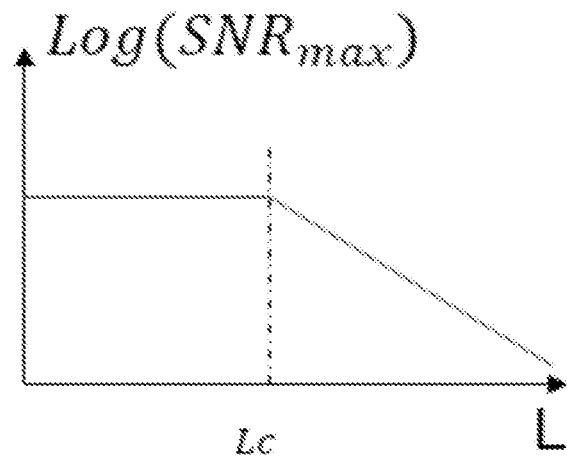
FIG. 5 shows the dependence of the maximum signal/noise ratio $SNR_{max}$ of a piezoresistive element gauge according to the length of the latter.

In reference to the curves of FIGS. 3 and 4, the gauge is made of p doped silicon at $5 \times 10^{19}$ cm$^{-3}$ of dimensions 5 μm×250 nm×250 nm. The polarisation current can vary from a few tens to several hundreds of μA, with an electrical resistance of the element 3 of R≈2000Ω, with a maximum current of 400 μA.

This piezoresistive element 3 can comply with a conventional piezoresistive gauge. Concerning the measuring circuit, conventional means can also be implemented.

As in the case of the gauge of the state of the art presented in FIG. 1, the piezoresistive element 3 can fully extend between two anchorings 31,32, in this case at two ends of the piezoresistive element 3. When the device is in operation, the polarisation current typically reaches all of the gauge, from a first anchoring 31 up to a second anchoring 32. The piezoresistive element 3 is, in this case, of a square cross-section, but other cross-sections, in particular, polygonal, and in particular rectangular, are possible. A circular cross-section can also be considered. However, other geometric shapes are possible, in particular, a membrane.

According to an option, the element 3 is a continuous part between the anchorings 31, 32 and the thermal dissipation element(s) 5 which are thus connected on this single section of gauge material, for example superposed, in the direction Z or juxtaposed in the direction X. According to another option, the element 3 is discontinuous and is made of several sections cut by the thermal dissipation element(s) 5. In this case, the connection portion of each element 5 is a border of a section of the element 3.

Figure 2:
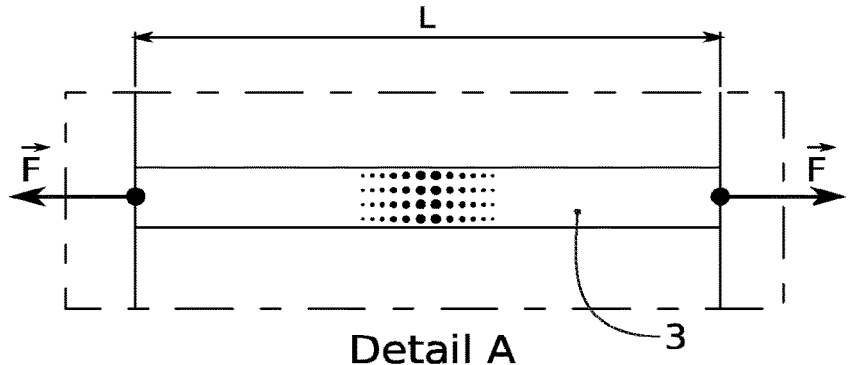
FIG. 2 represents a detection gauge extracted from the system of the preceding figure, and schematises an increase of the temperature located at the centre of the gauge.

In an embodiment, the element 3 is a beam, preferably of square transverse cross-section, the long dimension L of which is directed in the detection direction corresponding to that of the arrows F of FIG. 2.

The piezoresistive element 3 is above a face of the substrate 1. The latter can be made of silicon, optionally with a superficial oxide layer, native or not, defining this face.

In an embodiment, the suspending of the piezoresistive element 3 is produced as follows: the element 3 is defined at the surface of the substrate, for example in a monocrystalline silicon layer (for example, the upper layer of a substrate of the silicon on insulator type); then, the underlying layer (for example, the insulating material of a substrate of the silicon on insulator type), is etched, for example by chemical etching using hydrofluoric acid, to produce the release of the element 3. This etching is laterally limited, so as to preserve at least one anchoring 31 of the element 3 relative to the substrate 1. The face of the substrate 1 can be formed by the surface of a residual portion of the layer having formed the subject of the etching, typically an insulating material, like silicon oxide. It can also be formed by the surface of a layer initially located under the insulating layer or also by the surface of a transferred layer then, or also by the surface of an oxide layer formed naturally after the release of the element 3.

Figure 6A:
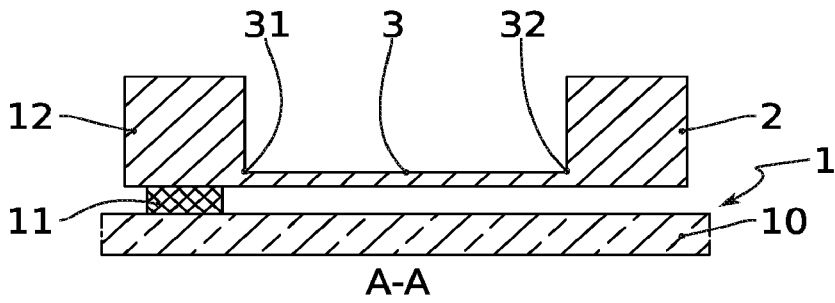
FIGS. 6A and 6B respectively represent a cross-sectional view and a top view of a device according to a first embodiment.
Figure 6A:
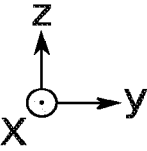
Figure 6B:
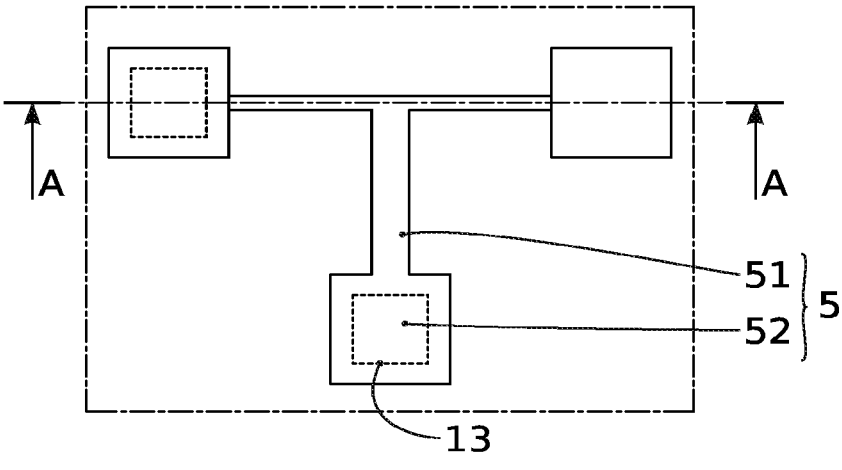
Figure 6B:
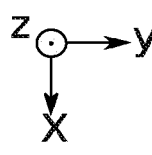

By referring to FIG. 6A, a first embodiment of the detection device according to the invention has been represented, as a cross-section along the lines A-A of FIG. 6B. The gauge is presented there in the form of a piezoresistive element 3 provided with the geometric shape of a beam, the long dimension of which extends in the direction Y of the plane XY which can be that of the face of the substrate 1. The axis Y moreover corresponds to the mechanical urging direction of the element 3 for the detection. The direction Z shown in FIG. 6B corresponds to the height of the members represented, and preferably extends perpendicularly to the face of the substrate 1.

The piezoresistive element 3 comprises a first anchoring 31, in this case positioned at a first end. The first anchoring 31 connects it in this example, to the substrate 1. Advantageously, this is a complete housing. By "complete housing of two parts", this means that these two parts have no degree of freedom of movement relative to one another. The piezoresistive element 3 can be of one single holding with the movable ground 2 and/or the anchoring pad 12.

According to an embodiment not represented, the piezoresistive element 3 is not anchored on the substrate 1. In particular, the first anchoring 31 can serve as a connection portion to another element, an anchoring portion, such as a second movable ground relative to the substrate 1. The first anchoring 31 is therefore not always a fixed point relative to the substrate.

To suspend the element 3 above the substrate, the latter comprises, in this example, an anchoring pad 12 serving as an anchoring portion and projecting beyond a base layer 10 of the substrate, an anchoring oxide part 11 connecting, in this illustration, the base layer 10 and the anchoring pad 12. For example, the part 11 can be a residual zone of an oxide layer having served the manufacture and having formed the subject of a partial etching. Under these conditions, the thickness of the part 11 corresponds to suspension height of the element 3.

Moreover, as indicated, the anchoring 31 can be done on a part other than the substrate 1, such as a movable ground. In this case, the pad 12, or another anchoring portion shape connected to the anchoring 31, is itself a part having a relative mobility with the substrate 1. In the case where the two anchorings 31 and 32 are thus movable relative to the substrate 1, the gauge can have the function of evaluating the relative movement of the two grounds that the anchorings connect. The grounds 2 and 12 can therefore both be movable along the axis y. They are each connected to the substrate by a specific mechanical path (without counting the gauge 3) which give them a rigidity k2 and k12 with respect to the substrate. The rigidity k5 of the element 5 with respect to this same substrate is thus preferably low before at least one of the two rigidities k2 and k12, such that the mechanical function of the gauge is good.

Generally, the part 11 advantageously serves as an electrical insulator between the element 3, the pad 12 and the zone, which is, for example, a part of the face of the substrate 1, to which the element 3 is connected by this end 31. The oxide layer indicated above ensures this function. Preferably, this electrical insulation, nevertheless, does not form a thermal insulation.

In the embodiments illustrated, a second anchoring 32 connects the element 3 to a movable ground 2. The latter is the member which will be sought to be evaluate the behaviour in terms of movement and/or mechanical urging. In particular, the movable ground 2 can serve as a movable part according to at least one degree of freedom, the movement according to this degree of freedom then being detected by the gauge, due to the traction or compression of the piezoresistive element 3. The second anchoring 32 is also preferably a complete housing. Optionally, the movable ground 2 can be produced in the same manufacturing phase as the piezoresistive element 3 and can come from one same material layer shaped, in particular, by etching.

Characteristically, the detection device further comprises at least one thermal dissipator element 5. The latter is connected to the piezoresistive element 3, so as to ensure a thermal conduction between these two elements, this thermal conduction being configured to discharge some of the heating applied to the piezoresistive element 3 during its operation, in particular due to the polarisation current. It can also be connected, with thermal conduction, to a thermal store (a ground making it possible to absorb calories), such as the substrate.

According to a first option, the thermal dissipator element 5 is made of a material different from that of the piezoresistive element. For example, materials can be used, having a greater thermal conductivity. In this embodiment, a thermal dissipator element material 5 can moreover be selected, which has an electrical resistivity greater than that of the piezoelectric element 3, and preferably, which constitutes a dielectric in this application; this makes it possible to not impact the operation of the electrical measurement. For example, the resistivity ratio can be greater than 100. For example, the thermal dissipator element 5 can be produced with a diamond layer, which has an excellent thermal conductivity and which is comprised like an electrical insulator. In this case, a material transfer can be considered (diamond on the substrate) on which the at least one gauge is manufactured.

According to another option, this is made of the same material. Thus, for example, the thermal dissipator element 5 can be made of silicon or of other semiconductive materials. Generally, however, it can be arranged, such that the thermal dissipator element(s) 5 is/are electrically insulated from the gauge. Indeed, an electrical discontinuity or a resistance at least five times greater between the output of the element 5 and the anchorings 31 and 32 without passing through the gauges themselves is preferably needed; more specifically, it is possible that the impedance of the electrical loops passing through the element 5 and the anchoring 31 and/or through the element 5 and the anchoring 32 is greater by a factor of at least five, with respect to the individual gauges.

If a dissipator element 5 is made of a material having a significant electrical conductivity, an electrically insulating interface can be formed at the connection portion.

In a non-limiting manner, the thermal dissipator element (s) is made of one single holding with the piezoresistive element 3. In particular, these two parts can be made of a suitably shaped material. For example, the thermal dissipator element 5 can be produced during the release phase of the piezoresistive element 3.

A thermal dissipator element 5 is connected at one of its ends to a connection portion of the piezoresistive element 3. The element 5 is moreover preferably suspended from the connection portion, so as to not alter, or to slightly alter, the freedom of deformation of the piezoresistive element 3 in the detection direction Y.

The other end of the thermal dissipator element 5 is anchored relative to a part of the device, other than the piezoresistive element 3, or also is connected to this part by a kinematic connection enabling at least one degree of freedom, which makes it possible to oppose slight resistance to the deformation of the gauge.

In the embodiments presented in the illustrations, the device part, other than the piezoresistive element 3 is the substrate 1. However, other arrangements are possible, for example by connecting the dissipator element 5 to another member of the device. In particular, this can be the movable ground 2 or the pad 12 (or other anchoring portion of the anchoring 31). Thus, the part of the device serving to discharge the calories generated by the piezoresistive element 3 can itself be a part having a mobility relative to the substrate 1.

In particular, when this part is a movable ground intervening in a measurement of the gauge, and in particular, for the movable ground 2 or the pad 12 if it is not anchored to the substrate, preferably an electrical insulation of the element 5 is ensured with respect to this part or, at the very least, it is ensured that this electrical insulation is effective with respect to the element 3 within the ground 2 or the pad 12.

Generally, the part of the device, to which the element 5 is connected, so as to discharge the calories of the piezoresistive element 3, is connected to this element 5, so as to not disrupt the electrical features useful for the operation of the gauge.

The dissipator element 5 can possibly discharge heat by a physical connection which has, with the latter, a thermal resistance that is lower than the element 3. Optionally, it also dissipates energy with the surrounding fluids, in the manner of a microelectronic radiator by maximising the exchange surface with the external environment. It is, in particular, relevant if the system is immersed in a fluid like oil.

At least in the transverse direction X or Z, the thermal dissipator element 5 has a dimension greater than that of the piezoresistive element 3.

As shown in FIG. 6B, the element 5 has a main extension direction directed along X. At the connection portion of the piezoresistive element 3 with the thermal dissipator element 5, a shift revealing a direction change of the material in this place is observed. The element 5 therefore has a main dimension (in this case, x) there which is oblique, and preferably perpendicular to the long direction of the element 3.

Preferably, the connection between the thermal dissipator element 5 and the substrate is made at an end of the element 5 which is located opposite the connection portion. In particular, when the element 5 has a longitudinal direction along the axis X, perpendicular to the axis Y of the gauge, the zone wherein it is connected to the substrate can be the zone located farthest away from the piezoresistive element 3.

A connection method can be used, for the element 5, similar to what has been described for the connection of the end 31, by way of a part 13, preferably electrically insulating, for example made of oxide, typically silicon oxide. During manufacture, the layer used to form these two parts 11, 13 can be common.

Preferably, the thermal conduction through the part 13 is significant, so as to maximise the dissipation of heat performed by the element 5. To this end, it is advantageous that the part 13 is made of a material having a good thermal conductivity level, and/or good geometric thermal conduction conditions, so as to have a significant thermal conductance, for example, the same as that of the thermal dissipation element 5.

In the case represented in FIG. 6B, the cross-section of the part 13 is less than that of the block 52 forming the distal end of the element 5. However, this case is not limiting and in particular, it can be sought that a larger surface, even all of the lower surface of the block 52, is connected to the part 13.

In the example of this figure, the thermal dissipator element comprises an arm 51 connected to the piezoresistive element 3 (the term "arm" is used, in this case, for an extended portion, of constant cross-section or not, in a longitudinal direction, and which has, in this direction, a greater rigidity—for example, at least ten times greater—than the rigidity observed in at least one direction transverse to the longitudinal direction, this at least one transverse direction, which could correspond to the detection direction of the gauge, namely the long dimension of the piezoresistive element 3); these parts form, in this case, a right angle and have behaviours of similar mechanical beams, but offset angularly by 90°. In particular, the rigidity of the arm 51 is weaker in the detection direction Y while it is maximum there for the element 3. This arrangement limits the mechanical impact of the dissipator element 5 on the rest of the gauge.

Generally, it is advantageous that the dissipator element 5 has an extended portion corresponding to the arm 51 in FIG. 6B, so as to reduce the rigidity of the element 5 in a favoured direction, namely the detection direction of the gauge, in this case, the axis Y.

It is desirable that the transverse rigidity along Y of the element 5 (for example, in this case, the assembly 51 and 52) with respect to the substrate, is low before the rigidity of the element 3, in the detection direction (in this case, Y).

In the case where the anchorings 31 and 32 are themselves movable, it is further desirable that the rigidity along Y of the element 5 (in this case, the assembly 51-52) with respect to the substrate 1 (in the absence of connection with the gauge 3) is lower than the rigidity of 31 or 32 with respect to the substrate in the absence of the connection with element 5.

In the example of FIG. 6A, the arm 51 is directly connected to the connection portion of the piezoresistive element 3, but other configurations are possible, as the following illustrations will show.

In this representation, the thermal dissipator element 5 extends laterally from the middle of the length of the piezoresistive element 3, such that the latter is divided into two half-beams, each having a double rigidity of this (in this case, called $k_p$) that the beam forming the piezoresistive element 3 would have individually. Under these conditions, the increase of the rigidity of the gauge in the detection direction Y such as produced by the thermal dissipator element 5 can remain low and roughly obeys the formula below: $(1+k_b/2k_p)(1+k_b/4k_p)$ where $k_b$ is the rigidity of the thermal dissipator element 5 along Y.

Below, an example of a dimensional selection is given:

The arm is a simple beam of shape factor $$r_b = \frac{w_b}{L_b}$$

and of thickness $t_b$

Rigidity condition:

$$k_p = \frac{ES_p}{L_p} \gg k_b = \frac{Et_b}{12} r_b^3,$$

E being the Young's modulus.

Thermal conductivity conditions:

$$R_{thp} = \frac{\rho_{th}L_p}{w_p t_p} \gg R_{thb} = \frac{\rho_{th}L_b}{w_b t_b}$$

For a fixed arm thickness $t_b=t_p$, the shape factor of the cooling beam $r_b$ must satisfy:

$$u \ll r_b = \frac{w_b}{L_b} \ll \sqrt[\frac{1}{3}]{12u} \text{ With } u = \frac{t_p w_p}{t_b L_p} = r_p$$

the shape factor of the gauge.

Digital application for a gauge of 0.25×0.25×5 μm³.

For reasons of manufacturing method simplicity, the use of an arm 51 of the same thickness as the gauge can be considered. It is verified that the conditions can be respected: If $$t_b = t_p = 0.25 \ \mu\text{m} : u = \frac{1}{20}$$

There is $$0.05 \ll r_b = \frac{w_b}{L_b} \ll 0.84$$

The shape factor rb=0.2 can be suitable

For example, a width can be taken:

$w_b$=1 μm: 1.2 μm<<$L_b$<<20 μm that is $L_b$=5 μm $w_b$=2 μm 2.4 μm<<$L_b$<<40 μm that is $L_b$=10 μm FIG. 6B moreover reveals, in a non-limiting manner, as the arm 51 can be sufficient, that the thermal dissipator element 5 continues beyond the arm 51 by a block 52 having at least one dimension, transverse to the longitudinal dimension of the arm 51, greater than the corresponding dimension of said arm 51; in particular, the block 52 can have an extension in the direction Y, for example with a dimension, two to three times greater than that of the arm 51 in this direction.

The element 5, in particular at its distal end, is connected to the substrate. For example, the block 52 can be anchored on the face of the substrate 1 by the part 13 described above. In this configuration, the element 5 comprises a part of low rigidity by the arm 51 and a more solid part by the block 52 for a connection to the substrate optimising the thermal conduction towards the latter.

Still in the embodiment of FIGS. 6A and 6B, the dimension by height of the thermal dissipator element 5 is fixed. Moreover, this dimension corresponds to that of the piezoresistive element 3.

Generally, and in all the embodiments, in the direction X, the arm 51 can, for example, have a dimension of at least 1 μm, and preferably of at least 3 μm. The assembly of the dissipator element 5 can have a great length, and for example, of at least 5 μm, even at least 10 μm, and preferably more than 20 μm. In the direction Y, its dimension is preferably less than or equal to 5 μm, even 2 μm, and preferably less than or equal to 1 μm.

Figure 7A:
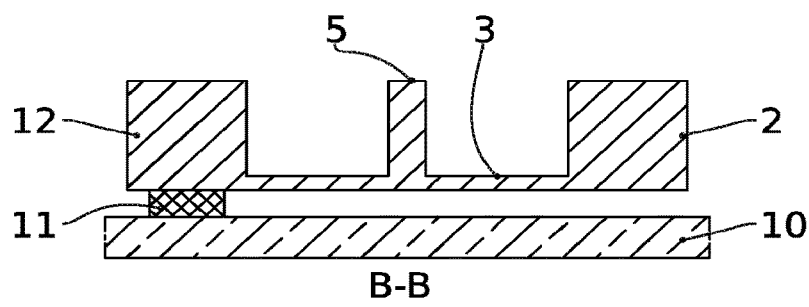
FIGS. 7A and 7B respectively represent a cross-sectional view and a top view of a device according to a second embodiment.
Figure 7B:
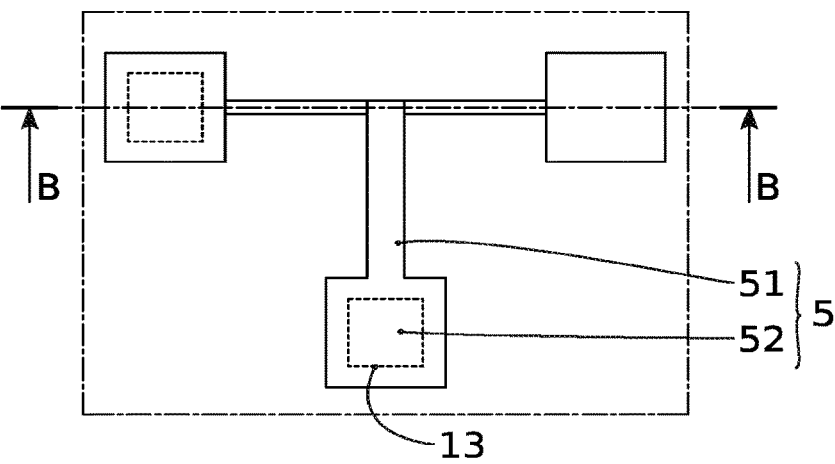

The embodiment presented in FIGS. 7A and 7B is quite close to the preceding one, except in that the dimension by height, along Z, of the thermal dissipator element 5 is greater than that of the piezoresistive element 3. For example, this thickness can correspond to that of the piezoresistive element 3. For example, this thickness can correspond to that of the anchoring pad 12 of the detection device. This can be a thickness of more than 1 μm, and for example, of 20 μm. The height along Z of the thermal dissipator element 5 is typically at least twice, preferably at least five times, greater than the height along Z of the piezoresistive element. In the arrangement illustrated, the element 5 thus clearly projects above the piezoresistive element 3.

This configuration significantly increases the thermal effectiveness of the element 5, without however penalising the rigidity. This makes it possible to reduce the shape ratio between the width of the arm 51 along Y and the length of the arm 51 along X, for example at a value of 1/25. In particular, by taking an arm 51 width of 1 μm, the length of the arm can be chosen from 25 μm, and for example, between 25 and 50 μm. Advantageously, the condition on the thermal resistance of the arm and on its rigidity is simpler and opens a larger sizing space, by adding an additional degree of freedom for the sizing of the arm. For example, it is possible to keep the thermal conductance constant at a low level by increasing the thickness and by reducing the shape ratio in inverse proportions. A significant drop of the transverse rigidity can thus be advantageously obtained, thus the thickness of the part 5 in line with the shape ratio are two parameters which make it possible to adjust the rigidity and thermal resistance conditions to meet the needs of the invention.

As above, a part 13 of the substrate 1 is connected to the dissipator element 5 to discharge calories.

For example, for the gauge type of 5 μm length, the passage to a structure of 2×2.5 μm makes it possible to double the SNR:

By ensuring a top polarisation current of $I_0$=800 μA

A maximum heating temperature (at the middle of the gauge, in this case, in the form of beams) being substantially identical to the situation without cooling arms.

In practice, for $L_b$=25 μm, $t_b$=20 μm and $w_b$=1 μm, there is:

$$k_b \approx \frac{k_p}{10} \ \text{and} \ R_{thb} = \frac{R_{thp}}{64}$$

The resonance frequency of the beams described, in this case, is initially greater than a few hundred kHz, that is $f_r$>>$f_r$ MEMS, $f_r$ MEMS of around 10 kHz typically for accelerometers, gyrometers. The dimensions of the arm are to be adapted according to the MEMS to respect the condition on the resonance frequency.

Figure 8A:
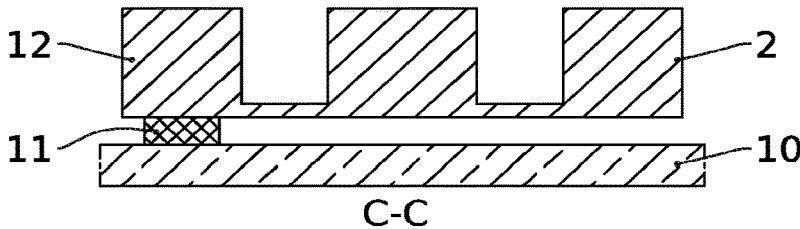
FIGS. 8A and 8B respectively represent a cross-sectional view and a top view of a device according to a third embodiment.
Figure 8B:
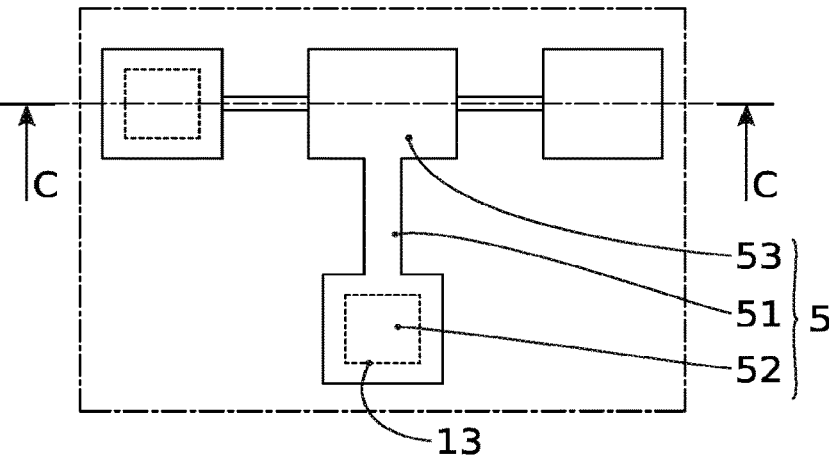

In the case of FIGS. 8A and 8B, the part of the thermal dissipator element 5 associated with the connection portion of the piezoresistive element 3 is a second block 53; in this configuration, the element 5 has, at the connection portion, a dimension in the direction Y, which is greater than previously, and which can be of at least one, even several micrometres. In addition, the block 53 can extend in the direction X on either side of the piezoresistive element 3. It can typically be a block superposed on the element 3. It is understood that the presence of a more solid portion of the thermal dissipator element regarding the connection portion with the piezoresistive element is favourable to the cooling of the latter, insofar as the thermal exchange zone is greater and where the dissipator element is more solid to absorb the heating.

Like in the preceding cases, the other end of the element 5 is connected to the substrate 1, for a part 13 of the latter.

As above, the limitation of rigidity of the thermal dissipator element 5 along Y is produced by the presence of an arm 51 of a lower dimension along Y.

From an electrical standpoint, the resistance modification will be smaller than the thickness of the central block 53 will be large. The resistance of the block 53 will tend to decrease when the lateral dimensions (not parallel to the detection direction Y of the gauge) increase (in the event where the electrical resistivity is constant in the element 5).

From a mechanical standpoint, the impact of the central block 53 is more reduced when $k_b \ll k_m$ (rigidity of the gauge along Y). The presence of the block 53 will tend to decrease the resonance frequency of the element 5 in particular for large sizes (in particular >10 μm).

However, the conditions on the other mechanical features can be and are initially different concerning the deformation response along the other axes and in rotation. The system proposed can advantageously be used to reduce the operating limit in compression of the gauges. For a length of the element 3 and of the given anchoring conditions, a top stress value in compression appears, beyond which the phenomenon buckling of the beam is had. By subdividing the gauge into two or several parts, it is possible to reject this limit. This can be done optimally by ensuring that the other rigidity parameters other than $k_b$ are large (the degrees of freedom of the block 53 other than the movement along Y are ideally immobilised).

Figure 9A:
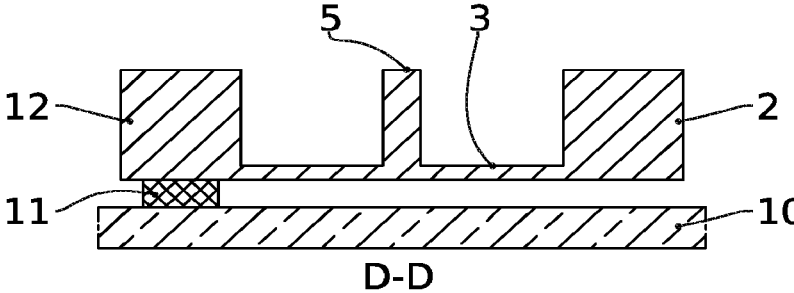
FIGS. 9A and 9B respectively represent a cross-sectional view and a top view of a device according to a fourth embodiment.
Figure 9B:
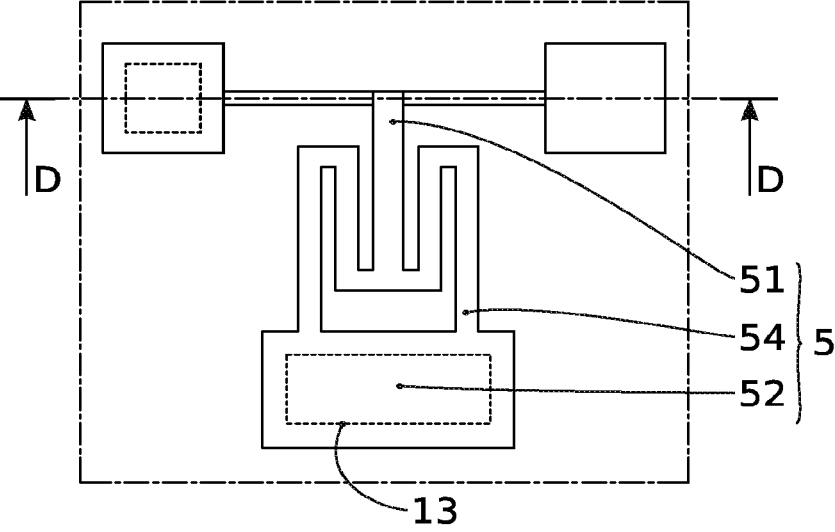

FIGS. 9A and 9B provide another variant of an embodiment wherein the thermal dissipator element 5 is provided with a spring member 54 extending beyond an arm 51. This member 54 makes is possible to increase the overall extension of the thermal dissipator element 5 without its dimension along the axis X (or Z) being too penalising. It can be produced by a shape folded in the direction Y and/or in the direction Z. It advantageously has several portions, each extending mainly in the direction X or the direction Y and connected to one another. Advantageously, the different portions of the spring member 54 are connected so as to form two-by-two, structures bent in the plane XY. As in the preceding embodiments, the illustration shows a dissipator element 5 connected to the substrate 1. Thus, a distal end of the spring member 54 is anchored to the substrate 1 by a part 13 of the latter. In this configuration, the member 54 moreover favours a limitation of the rigidity of the element 5.

Figure 10A:
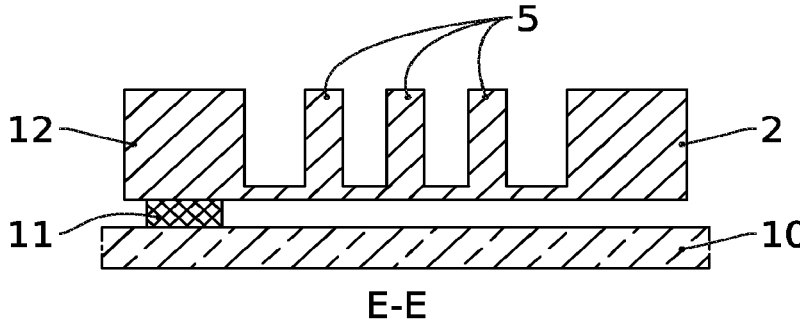
FIGS. 10A and 10B respectively represent a cross-sectional view and a top view of a device according to a fifth embodiment.
Figure 10B:
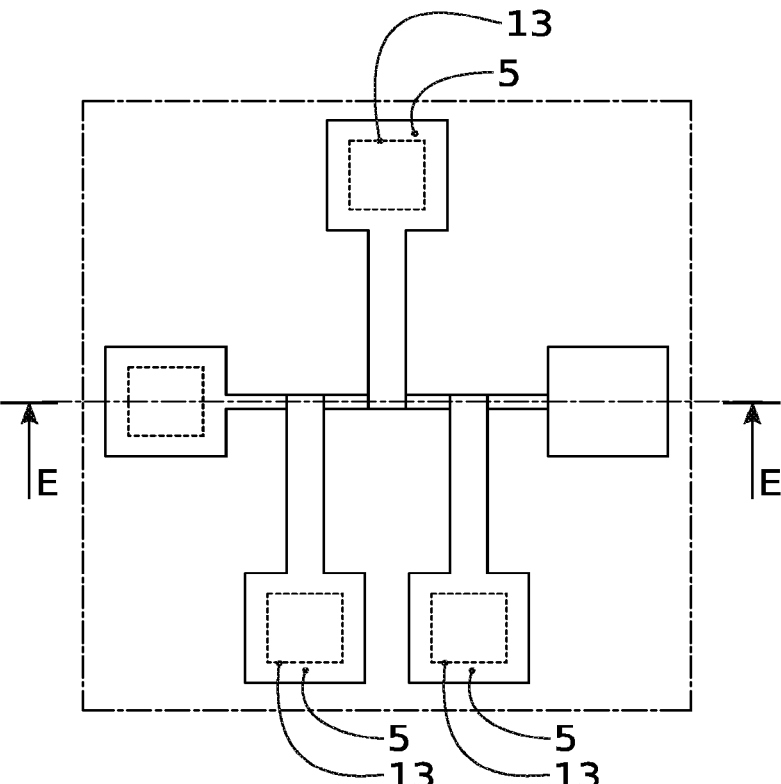

According to FIGS. 10A and 10B, three thermal dissipator elements 5 are distributed along the long dimension of the piezoresistive element 3. A first dissipator element 5 is positioned in the middle of the length of the piezoresistive element 3. The two other elements 5 are distributed on either side of the first, advantageously symmetrically. Generally, in the case of a plurality of thermal dissipator elements 5, it is advantageous that they are distributed symmetrically relative to the middle of the piezoresistive element and distributed homogenously over the whole of the deformation beam. As represented, the transfer side of the thermal dissipator elements can moreover alternate, on either side of the piezoresistive element 3.

Thus, in this arrangement, the thermal dissipator elements 5 are disposed in a staggered manner and delimit four sections, preferably of equal length, over the length of the piezoresistive element 3. The current limit can be increased by a ratio 4 just like the signal/noise ratio can be increased by a ratio 4 with the same heating in the piezoresistive element 3. To ensure an electrical insulation between the dissipators, it is advantageous that each of the dissipator elements 5 is individually connected to the substrate, by a part 13, ensuring a thermal conduction.

The invention is not limited to the embodiments described above and extends to all the embodiments covered by the claims. The present invention is not limited to the examples described above. Plenty of other variants of embodiments are possible, for example, by combination of features described above. Furthermore, the features described relative to an aspect of the invention can be combined with another aspect of the invention. For example, the formation of a block 52 or 53 can fully be presented in the examples of FIGS. 9A to 10B.

The invention claimed is:

1. A transduction detection device, comprising:
   a substrate;
   at least one movable ground relative to the substrate;
   a suspended stress gauge provided with a piezoresistive element which comprises a first anchoring relative to an anchoring portion and a second anchoring, different from the first anchoring, relative to the movable ground; and
   at least one thermal dissipator element thermally conductively connected at a first end to a first connection portion of the piezoresistive element located outside of the first and second anchorings, and at a second end at a second connection portion, to a thermal discharge part of the device, other than the piezoresistive element,
   wherein the thermal dissipator element includes an arm extending in a longitudinal direction and having, in a direction perpendicular to its longitudinal direction and to a detection direction, a dimension by height greater than a dimension by height of the piezoresistive element, and
   wherein the first end of the thermal dissipator element is directly connected to the piezoresistive element at the first connection portion and the second end of the thermal dissipator element is connected at the second connection portion at the thermal discharge part, and
   wherein the first connection portion and the second connection portion are located along a same longitudinal axis of the thermal dissipator arm.

2. The transduction detection device according to claim 1, wherein the piezoresistive element is crossed by an electrical current between the first anchoring and the second anchoring when said device is in operation.

3. The transduction detection device according to claim 1, wherein the thermal discharge part is one from among the substrate, the movable ground, the first anchoring.

4. The transduction detection device according to claim 1, wherein the anchoring portion is a portion of the substrate, and wherein the piezoresistive element comprises a first rigidity, in the detection direction, wherein the piezoresistive element is urged in traction or in compression, and wherein the thermal dissipator element has, in the detection direction, a second rigidity which is strictly less than the first rigidity.

5. The transduction detection device according to claim 4, wherein the second rigidity is at least five times lower than the first rigidity.

6. The transduction detection device according to claim 1, wherein the thermal dissipator element has, at the connection portion, an oblique main direction relative to a long dimension of the piezoresistive element.

7. The transduction detection device according to claim 1, wherein the thermal dissipator element comprises a suspended part extending from the connection portion.

8. The transduction detection device according to claim 7, wherein the arm has a shape ratio between a longitudinal dimension and a dimension of the arm in the detection direction of at least 5.

9. The transduction detection device according to claim 1, wherein a ratio between the dimension by height of the thermal dissipator element and the dimension by height of the piezoresistive element is greater than 2.

10. The transduction detection device according to claim 1, wherein the dimension by height of the thermal dissipator element is greater than 1 μm.

11. The transduction detection device according to claim 1, wherein the dimension by height of the thermal dissipator element is greater than 20 μm.

12. The transduction detection device according to claim 1, wherein the connection portion is located in the middle of a long dimension of the piezoresistive element.

13. The transduction detection device according to claim 1, wherein the thermal dissipator element has a thermal conductance greater than or equal to that of the piezoresistive element.

14. The transduction detection device according to claim 1, wherein the thermal dissipator element has at least one degree of freedom of movement relative to the thermal discharge part.

15. The transduction detection device according to claim 1, wherein the thermal dissipator element comprises a spring member.

16. The transduction detection device according to claim 15, wherein the spring member has a folded shape.

17. The transduction detection device according to claim 15, wherein a distal end of the spring member is anchored to the substrate.

18. The transduction detection device according to claim 1, wherein the thermal dissipator element comprises a resonance frequency strictly greater than that of an assembly formed by the gauge and the movable ground.

19. The transduction detection device according to claim 1, comprising several thermal dissipator elements.

20. The transduction detection device according to claim 19, wherein the thermal dissipator elements are each connected to a connection portion of the piezoresistive element, the connection portions cutting the piezoresistive element into sections of identical length along the long dimension of the piezoresistive element.

21. The transduction detection device according to claim 19, wherein the thermal dissipator elements are alternately disposed on either side of the long dimension of the piezoresistive element.

\*  \*  \*  \*  \*